United States Patent
Lin et al.

(10) Patent No.: US 10,677,957 B2
(45) Date of Patent: Jun. 9, 2020

(54) METHOD FOR RANDOM NOISE REDUCTION FROM MRS OSCILLATING SIGNAL USING JOINT ALGORITHMS OF EMD AND TFPF

(71) Applicant: Jilin University, Changchun (CN)

(72) Inventors: Tingting Lin, Changchun (CN); Yang Zhang, Changchun (CN); Yue Li, Changchun (CN); Ling Wan, Changchun (CN); Jun Lin, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 15/943,852

(22) Filed: Apr. 3, 2018

(65) Prior Publication Data

US 2019/0120995 A1    Apr. 25, 2019

(51) Int. Cl.
*G01V 3/38* (2006.01)
*G01V 3/14* (2006.01)

(52) U.S. Cl.
CPC ............... *G01V 3/38* (2013.01); *G01V 3/14* (2013.01); *G01V 2210/21* (2013.01); *G01V 2210/22* (2013.01); *G01V 2210/3248* (2013.01)

(58) Field of Classification Search
CPC ............ G01R 33/20–64; G01V 3/08–40
See application file for complete search history.

(56) References Cited

U.S. PATENT DOCUMENTS

| | | | | |
|---|---|---|---|---|
| 7,579,833 B2* | 8/2009 | Shorey | ............... | G01N 24/081 324/303 |
| 8,816,684 B2* | 8/2014 | Walsh | ............... | G01R 33/36 324/303 |
| 2006/0186882 A1* | 8/2006 | Walsh | ............... | G01R 33/3415 324/309 |
| 2014/0035578 A1* | 2/2014 | Song | ............... | G01V 3/32 324/309 |
| 2014/0253119 A1* | 9/2014 | Walsh | ............... | G01R 33/36 324/309 |
| 2016/0195631 A1* | 7/2016 | Morrison | ............... | G01V 3/12 324/339 |
| 2016/0291191 A1* | 10/2016 | Fukushima | ............... | G01R 33/3415 |
| 2016/0367141 A1* | 12/2016 | Lee | ............... | A61B 5/4875 |
| 2017/0176360 A1* | 6/2017 | Reiderman | ............... | G01R 33/448 |

* cited by examiner

*Primary Examiner* — Huy Q Phan
*Assistant Examiner* — David B Frederiksen
(74) *Attorney, Agent, or Firm* — Fox Rothschild LLP

(57) ABSTRACT

The instant invention relates to a method for noise reduction from a magnetic resonance sounding (MRS) oscillating signal, and more particularly, to a data processing method for reducing random noise contained in MRS oscillating signal based on joint algorithm principles of EMD and TFPF. A MRS oscillating signal is decomposed into different eigen-mode components by using decomposition characteristic of EMD algorithm; then a signal-dominated eigen-mode component is encoded as an instantaneous frequency of an analytical signal of unit amplitude using TFPF algorithm; and random noise is suppressed with the characteristics that the time-frequency distribution of the analytical signal is concentrated along with the instantaneous frequency. The method requires fewer filtering constraints and is simple to operate without need of designing a filtering interval in the time-frequency domain, and has good adaptability to the MRS oscillating signal with a low signal-noise-ratio.

3 Claims, 6 Drawing Sheets

METHOD FOR RANDOM NOISE REDUCTION FROM MRS OSCILLATING SIGNAL USING JOINT ALGORITHMS OF EMD AND TFPF

CROSS REFERENCE TO RELATED APPLICATION

The application claims priority of Chinese Patent Application No. 201710981777.4, filed on Oct. 20, 2017. The content of this application is incorporated herein by reference in its entirety.

FIELD OF THE DISCLOSURE

The present invention relates to a method for noise reduction from a magnetic resonance sounding (MRS) signal, and more particularly, to a data processing method for reducing random noise contained in MRS oscillating signal based on joint algorithm principles of EMD and TFPF.

BACKGROUND

Magnetic resonance technology for detecting groundwater is a new and developing geophysical detection technology, has attracted extensive attention and achieved rapid development due to its advantages of direct detection and quantitative assessment. So far, it has been gradually developed from the theoretical research to the development of a relatively mature detection instrument system, which has been utilized for field measurement in some areas and has successfully detected shallow groundwater resources. The detection is of great significance to improve the current status of water-shortage and predict geological disasters caused by groundwater. However, a relaxation of stimulated hydrogen proton in groundwater generates very small magnitude (nV-level 1 nV=$10^{-9}$ V) of magnetic resonance signals is highly susceptible to interferences from various environmental noises. The random noise interference is difficult to remove because it has wide range of frequency band and is interlaced with the effective signal, and seriously affects the signal-to-noise ratio of the signal and results in large error of the post inversion interpretation. Consequently, effective eliminating of random noise and obtaining reliable magnetic resonance signals can improve the accuracy of the inversion interpretation results.

Chinese Patent CN104459809A discloses "a method of noise filtering from MRS oscillating signal based on independent component analysis", which mainly focuses on the power frequency harmonic interference or some single frequency interference in MRS oscillating signal. Firstly, an MRS water detection apparatus is utilized for collecting an MRS signal; and the frequency of the power frequency harmonic interference or some single frequency interference contained in the collected signal is obtained by spectrum analysis, an underdetermined blind source separation issue is solved by constructing an input channel signal with a digital orthogonal method; then an independent component analysis is performed on the constructed input channel signal and the collected MRS signal together as input signals to obtain a separated MRS signal; finally a spectral correction method is utilized to solve the problem of the unsteady amplitude of the separated MRS signal, so as to extract a de-noised MRS signal. Chinese Patent CN104898172A discloses "a method of noise filtering from a MRS signal based on cross-correlation". In the method, the characteristic of the non-correlation between noise and a sinusoidal signal of Larmor frequency and the correlation between an FID amplitude attenuation sinusoidal signal and the sinusoidal signal of Larmor frequency are utilized; the noise is filtered by the cross-correlation operation; then an envelope of the cross-correlation waveform is fitted, and the cross-correlation waveform having no noise is reconstructed; finally, a de-convolution algorithm is used for extracting FID signal from the MRS data. Chinese Patent CN104614778A discloses "a method of noise elimination from a MRS groundwater detecting signal based on ICA". In the method, firstly, three sets of MRS response data are entered; Fourier Transform is performed on the three sets of data respectively, to determine the power frequency harmonics contained in the vicinity of the MRS center frequency in each set of data; then a sine function and a cosine function are constructed with the frequency which is the same as the power frequency harmonics and the length which is the same as the length of MRS corresponding data; an observed signal is composed of the functions and the MRS response data; an independent component analysis algorithm is utilized to separate each set of observed signals to obtain an unmixed signal; the data is reconstructed to eliminate the interference of the power frequency harmonics; then the three sets of MRS data with removed power frequency harmonics are processed as the observed signals using an ICA algorithm, to reduce the interference of the residual random noise. Jiang Chuandong's paper titled "Statistical stacking and adaptive notch filter to remove high-level electromagnetic noise from MRS measurements" was published in the Near Surface Geophysics [2011, 9(5), Pages 459-468]. Jiang uses a superposition method to suppress random noise, utilizes a magnetic resonance groundwater detecting system to collect signals multiple times ($N_s$ times), and superposes all of individually collected signals; so that the signal-to-noise ratio can increase $\sqrt{N_s}$ times.

The method of noise filtering from a MRS signal based on independent component analysis as stated above can solve the underdetermined blind source issue and the amplitude uncertainties issue which are customary in the independent component analysis, and have the advantages of fast operation, high signal to-noise ratio, high practicability, etc., compared with conventional methods for de-noising MRS signals. However, the method can only implement filtering the inference of the power frequency and the inference of certain frequency, and cannot suppress the noise interference with a large frequency band distribution range, such as random noise. The method of noise filtering from a MRS oscillating signal based on cross-correlation as stated above can simultaneously suppress the power frequency and its harmonic noise, random noise and spike noise; however, the method mainly utilizes the characteristic of non-correlation between noise frequency and signal frequency, and cannot remove the overlap between the frequency component in the random noise and the signal frequency. The method of noise elimination from a MRS groundwater detecting signal based on ICA, as stated above, has no requirement of prior knowledge of the source signal and transmission channel, has no need of arranging a reference coil in the test process, and has the advantages of operation simple, convenient and high efficiency; however, the method requires at least three sets of data, complex calculation processes, a large amount of calculation; and it is difficult for those not skilled in the art to manipulate the method. The superposition method as stated above is the simplest and commonly-used method of random noise elimination from a magnetic resonance signal. In electromagnetic noise environment having the same intensity, the superposition method utilizes less superposition times to obtain the groundwater magnetic resonance signal with higher signal-to-noise ratio; but when the noise intensity is large, multiple superposing is needed and the measuring time is increased, resulting in lowering the working efficiency of the instrument and limited noise elimination effect.

SUMMARY

The present invention fills at least the foregoing needs by providing a method of random noise reduction from a MRS oscillating signal using joint algorithms of Empirical Mode Decomposition (EMD) and Time-Frequency Peak Filtering (TFPF). The present invention can reduce random noise efficiently without losing signal components, has a good adaptability to the MRS oscillating signal with a low signal-noise-ratio impacted by random noise, and can obtain good noise reduction effect by a single detection. The method of the present invention can improve the detection efficiency of magnetic resonance detection technology.

The object of the present invention is achieved by the following embodiments:

A method for reducing random noise from a MRS oscillating signal using joint algorithms of EMD and TFPF, comprising the following steps:

a). performing an EMD decomposition for a magnetic resonance sounding (MRS) observed signal $X(n)$ which is collected by a MRS groundwater detector, to decompose i different eigen-mode components $C_1(n), \ldots, C_i(n)$ and one trend term $R_i(n)$ from a high frequency to a low frequency, and $X(n)=C_1(n)+ \ldots +C_i(n)+R_i(n)$ ; where n is a discrete sample point;

b). performing a Fourier Transform and an auto-correlation analysis for the eigen-mode components $C_1(n), \ldots, C_i(n)$ and the trend term $R_i(n)$, synthesizing the Fourier Transform results and the auto-correlation analysis results to obtain noise-dominated mode components and signal-dominated mode components, and extracting the signal-dominated mode components $c_1(n), \ldots, c_j(n)$ ; where j is the number of the signal-dominated mode components;

c). using a TFPF algorithm to process the signal-dominated mode components $c_1(n), \ldots, c_j(n)$ respectively, to eliminate random noise contained in each signal-dominated mode component to obtain signal components $s_1(n), \ldots, s_j(n)$; and d). adding the signal components $s_1(n), \ldots, s_j(n)$ to obtain a final MRS oscillating signal $s(n)$ having no random noise interference, $s(n)=s_1(n)+ \ldots +s_j(n)$ The EMD decomposition in the step a) uses EMD algorithm; and the use of the EMD algorithm may comprise:

first step, identifying all the maximum points and all the minimum points of the observed signal $X(n)$, and performing a cubic spline interpolation for all the maximum points and all the minimum points respectively, to obtain an upper envelope curve $E_{max}(n)$ and a lower envelope curve $E_{min}(n)$ of the data;

second step, calculating a corresponding average value of the upper and lower envelope curves to obtain a mean curve $F_1(n)$;

$$F_1(n) = \frac{E_{max}(n) + E_{min}(n)}{2}$$

third step, subtracting the average value $F_1(n)$ from the observed signal $X(n)$ to obtain a detail component $H_1(n)$, and determining whether the detail component is an eigen-mode function on condition that:

①. a mean of the function is zero; the function is local symmetry, and the number of zero-crossing points and the number of extreme points are the same or differ at most by one; and ②. the sum of the upper and lower envelope values of the function is always zero at any time;

if the conditions are not satisfied, repeating the first and second steps for $H_1(n)$ until satisfying the conditions, and obtaining a first eigen-mode component $C_1(n)$;

fourth step, subtracting the first eigen-mode component $C_1(n)$ from the observed signal $X(n)$ to obtain an amount of residual $R_1(n)$, that is:

$$X(n)-C_1(n)=R_1(n)$$

repeating the first, second and third steps for the amount of residual $R_1(n)$ as a new signal to be processed, for continuous screening signal; until obtaining a second eigen-mode component $C_2(n)$, and so on, obtaining i different eigen-mode components $C_1(n), \ldots, C_1(n)$ and one trend item $R_i(n)$:

$$R_1(n)-C_2(n)=R_2(n), \ldots, R_{i-1}(n)-C_i(n)=R_i(n)$$

$$X(n)=C_1(n)+ \ldots +C_i(n)+R_i(n);$$

In the step c, the TFPF algorithm is used for processing the signal-dominated mode components to obtain the signal components. The processing comprising:

1). performing an edge data extension for the signal-dominated mode component $c_j(n)$ to obtain an extended signal $c'_1(m)$, that is, $$c'_1(m) = \begin{cases} c_1(1), & 1 \le m \le p \\ c_1(m-p), & p+1 \le m \le p+N \\ c_1(N), & p+N+1 \le m \le 2p+N \end{cases}$$

where N is a length of the original observed signal, p is the number of data points extended at both ends;

2). scaling the extended signal $c'_1(m)$:

$$d'_1(m) = (a-b) \cdot \frac{c'_1(m) - \min[c'_1(m)]}{\max[c'_1(m)] - \min[c'_1(m)]} + b$$

where $d'_1(m)$ is the scaled signal, the coefficients a and b are the maximum value and the minimum value of the scaled signal respectively, satisfying $0.5 \ge a = \max[d'_1(m)]$, $b=\min[d'_1(m)] \ge 0$;

3). performing frequency modulation encoding on the scaled signal $d'_1(m)$ to obtain an analytical signal of unit amplitude:

$$z_1(m) = e^{j2\pi \Sigma_{\lambda=0}^m d'_1(\lambda)}$$

where $z_1(m)$ is the analytical signal obtained after the frequency modulation encoding;

4). performing Discrete Pseudo-Wigner-Ville Transform for the obtained analytical signal $z_1(m)$ to calculate a time-frequency distribution of $z_1(m)$:

$$W_{Z_1}(m, k) = 2 \sum_{l=-L}^{L} w(l) z_1(m+l) z_1^*(m-l) e^{-j4\pi kl}$$

where w(l) is a window function and its width is 2L+1;

5). taking the peak of $W_{z_1}(m, k)$ as a valid estimate of the signal, that is:

$$\widehat{s_1}'(m) = \arg_k \max[W_{z_1}(m, k)]$$

where $\arg_k \max[\bullet]$ represents taking the maximum operator along frequency;

6). inverse-scaling the estimated value of the valid signal, and restoring the signal amplitude:

$$\widehat{s_1}(m) = \frac{(\widehat{s_1}'(m) - b)(\max[c_1'(m)] - \min[c_1'(m)])}{a - b} + \min[c_1'(m)]$$

7). removing the extended edge obtained after filtering, to obtain the signal component $s_1(n)$ from which the random noise has been eliminated:

$$s_1(n) = \widehat{s_1}(n+p), 1 \leq n \leq N$$

8). next, processing the signal-dominated mode components $c_2(n), \ldots, c_j(n)$ sequentially in accordance with the above steps 1) to 7), to obtain the signal components $s_2(n), \ldots, s_j(n)$ from which the random noise has been eliminated.

Technical Effects:

The present invention provides a "blind" filtering method without need of designing a filtering interval. Firstly, a MRS oscillating signal is decomposed into different eigen-mode components by utilizing decomposition characteristic of EMD algorithm; then a signal-dominated eigen-mode component is encoded as an instantaneous frequency of an analytical signal of unit amplitude using TFPF algorithm; and the random noise is suppressed with the characteristics that the time-frequency distribution of the analytical signal is concentrated along with the instantaneous frequency. The random noise is reduced efficiently without losing signal content, which is highly important to inversion interpret hydrogeological parameters accurately. This method requires fewer filtering constraints and is simple to operate without need of designing a filtering interval in the time-frequency domain, and has good adaptability to the MRS oscillating signal with a low signal-noise-ratio. The detection efficiency can be improved significantly; a good noise reduction effect can be achieved by a single measurement; the signal-noise-ratio can be improved significantly; and the accuracy of the post inversion interpretation can also be improved; thus the method of the present invention has good practicability.

DETAILED DESCRIPTION

Figure 1:
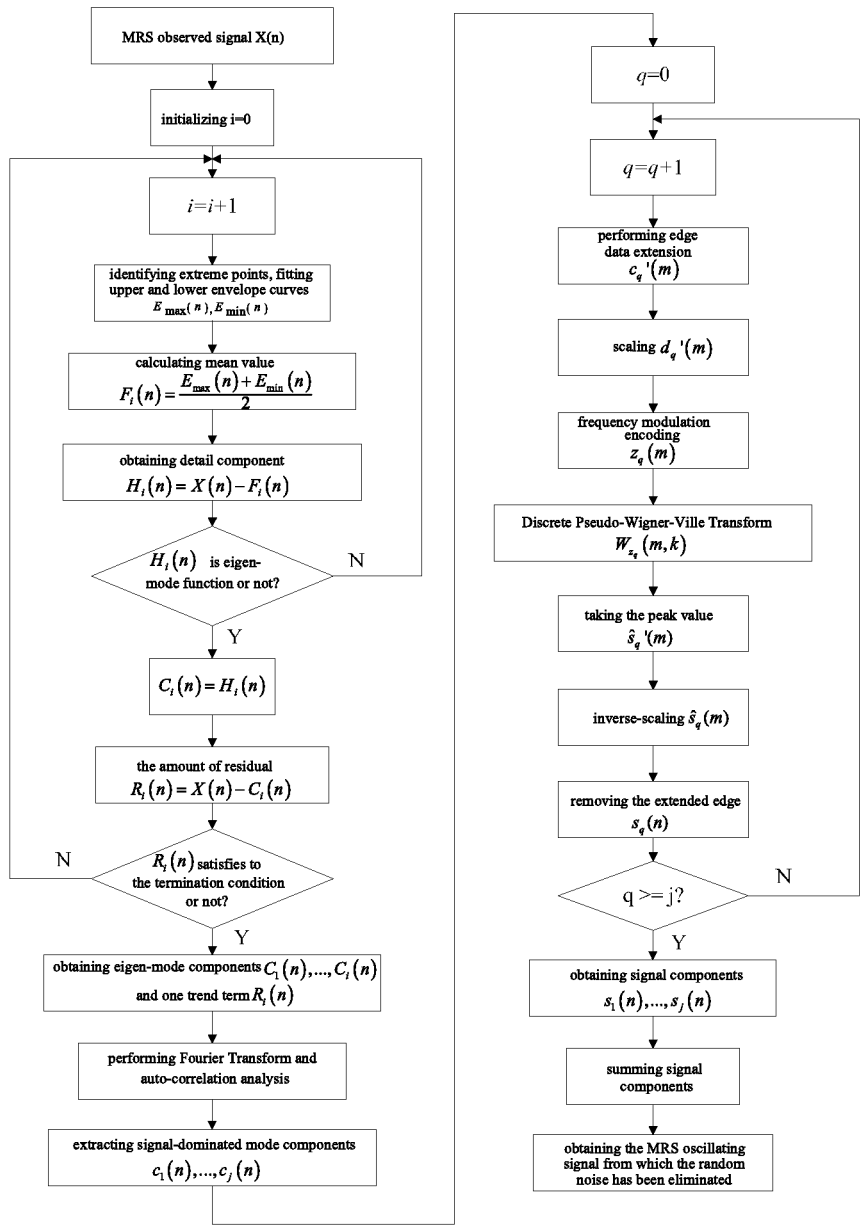
FIG. 1 is a flow chart of a method of random noise reduction from a MRS oscillating signals using joint algorithms of EMD and TFPF.

The present invention will be now further described in detail below with reference to the accompanying drawings and embodiments.

In accordance with an embodiment of the present invention, a method of random noise reduction from a MRS oscillating signal using joint algorithms of EMD and TFPF, comprises the following steps:

a). performing an EMD decomposition for a MRS observed signal X(n) which is collected by a MRS groundwater detector, to decompose i different eigen-mode components $C_1(n), \ldots, C_i(n)$ and one trend term $R_i(n)$ from a high frequency to a low frequency, and $X(n) = C_1(n) + \ldots + C_i(n) + R_i(n)$ ; where n is a discrete sample point;

performing a Fourier Transform and an auto-correlation analysis for the eigen-mode components $C_1(n), \ldots, C_i(n)$ and the trend term $R_i(n)$, synthesizing the Fourier Transform results and the auto-correlation analysis results to obtain noise-dominated mode components and signal-dominated mode components, and extracting the signal-dominated mode components $c_1(n), \ldots, c_j(n)$ ; where j is the number of the signal-dominated mode components;

c). using a TFPF algorithm to process the signal-dominated mode components $c_1(n), \ldots, c_j(n)$ respectively, to eliminate random noise contained in each signal-dominated mode component to obtain signal components $s_1(n), \ldots, s_j(n)$; and d). adding the signal components $s_1(n), \ldots, s_j(n)$ to obtain a final MRS oscillating signal s(n) having no random noise interference, $s(n) = s_1(n) + \ldots + s_j(n)$.

The EMD decomposition in the step a) uses EMD algorithm; and the use of the EMD algorithm comprises:

first step, identifying all the maximum points and all the minimum points of the observed signal X(n), and performing a cubic spline interpolation for all the maximum points and all the minimum points respectively, to obtain an upper envelope curve $E_{max}(n)$ and a lower envelope curve $E_{min}(n)$ of the data;

second step, calculating a corresponding average value of the upper and lower envelope curves to obtain a mean curve $F_1(n)$;

$$F_1(n) = \frac{E_{max}(n) + E_{min}(n)}{2}$$

third step, subtracting the average value $F_1(n)$ from the observed signal X(n) to obtain a detail component $H_1(n)$, and determining whether the detail component is an eigen-mode function on condition that:

①. a mean of the function is zero; the function is local symmetry, and the number of zero-crossing points and the number of extreme points are the same or differ at most by one; and ②. the sum of the upper and lower envelope values of the function is always zero at any time;

if the conditions are not satisfied, repeating the first and second steps for $H_1(n)$ until satisfying the conditions, and obtaining a first eigen-mode component $C_1(n)$;

fourth step, subtracting the first eigen-mode component $C_1(n)$ from the observed signal $X(n)$ to obtain an amount of residual $R_1(n)$, that is:

$$X(n) - C_1(n) = R_1(n)$$

repeating the first, second and third steps for the amount of residual $R_1(n)$ as a new signal to be processed, for continuous screening signal; until obtaining a second eigen-mode component $C_2(n)$, and so on, obtaining i different eigen-mode components $C_1(n)$, $C_i(n)$ and one trend item $R_i(n)$:

$$R_1(n) - C_2(n) = R_2(n), \ldots, R_{i-1}(n) - C_i(n) = R_i(n)$$

$$X(n) = C_1(n) + \ldots + C_i(n) + R_i(n);$$

The TFPF algorithm in the step c) is used for processing signal-dominated mode components, to obtain the signal components from which the random noise has been eliminated; and the processing comprises:

1). performing an edge data extension for the signal-dominated mode component $c_1(n)$ to obtain an extended signal $c'_1(m)$, that is, $$c'_1(m) = \begin{cases} c_1(1), & 1 \le m \le p \\ c_1(m-p), & p+1 \le m \le p+N \\ c_1(N), & p+N+1 \le m \le 2p+N \end{cases}$$

where N is a length of the original observed signal, and p is the number of data points extended at both ends;

2). scaling the extended signal $c'_1(m)$:

$$d'_1(m) = (a-b) \cdot \frac{c'_1(m) - \min[c'_1(m)]}{\max[c'_1(m)] - \min[c'_1(m)]} + b$$

where $d'_1(m)$ is the scaled signal, the coefficients a and b are the maximum value and the minimum value of the scaled signal respectively, satisfying $0.5 \ge a = \max[d'_1(m)]$, $b = \min[d'_1(m)] \ge 0$;

3). performing frequency modulation encoding on the scaled signal $d'_1(m)$ to obtain an analytical signal of unit amplitude:

$$z_1(m) = e^{j2\pi \sum_{\lambda=0}^{m} d_1'(\lambda)}$$

where $z_1(m)$ is the analytical signal obtained after the frequency modulation encoding;

4). performing Discrete Pseudo-Wigner-Ville Transform for the obtained analytical signal $z_1(m)$ to calculate a time-frequency distribution of $z_1(m)$:

$$W_{z_1}(m, k) = 2 \sum_{l=-L}^{L} w(l) z_1(m+l) z_1^*(m-l) e^{-j4\pi k l}$$

where $w(l)$ is a window function and its width is $2L+1$;

5). taking the peak of $W_{z_1}(m,k)$ as a valid estimate of the signal, that is:

$$\hat{s}_1'(m) = \arg_k \max[W_{z_1}(m,k)]$$

where $\arg_k \max[\cdot]$ represents taking the maximum operator along frequency;

6). inverse-scaling the estimated value of the valid signal, and restoring the signal amplitude:

$$\hat{s}_1(m) = \frac{(\hat{s}_1'(m) - b)(\max[c'_1(m)] - \min[c'_1(m)])}{a - b} + \min[c'_1(m)]$$

7). removing the extended edge obtained after filtering, to obtain the signal component $s_1(n)$ from which the random noise has been eliminated:

$$s_1(n) = \hat{s}_1(n+p), \quad 1 \le n \le N$$

8). Next, processing the signal-dominated mode components $c_2(n), \ldots, c_j(n)$ sequentially in accordance with the above steps 1) to 7), to obtain the signal components $s_2(n), \ldots, S_j(n)$ from which the random noise has been eliminated.

Figure 2:
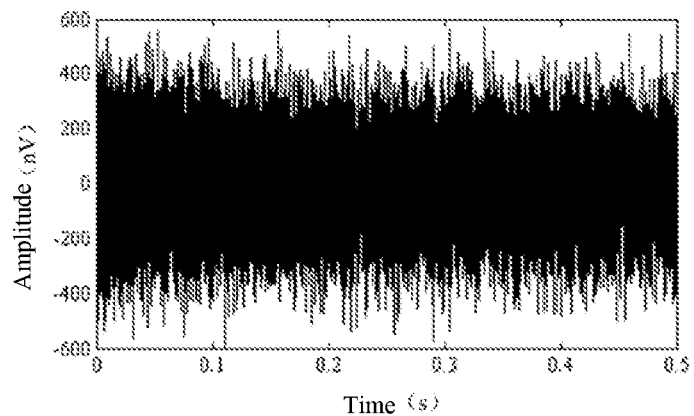
FIG. 2 shows a MRS observed signal containing a random noise.

The embodiment of the method of random noise reduction from a MRS oscillating signal using joint algorithms of EMD and TFPF will be further described in detail:

1). As shown in FIG. 1, the MRS observed signal $X(n)$ is read; and the observed signal is interfered by a random noise, and is collected by a MRS groundwater detector. FIG. 2 shows the observed signal.

2). All of extreme points of the observed signal $X(n)$, including the maximum points and the minimum points, are identified; and the cubic spline interpolation is performed for all of the maximum points and the minimum points respectively to obtain the upper envelope curve $E_{max}(n)$ and the lower envelope curve $E_{min}(n)$ of the data.

3). The corresponding average value of the upper and lower envelope curves is calculated to obtain the mean curve $F_1(n)$, $$F_1(n) = \frac{E_{max}(n) + E_{min}(n)}{2}.$$

4). The average value $F_1(n)$ is subtracted from the observed signal $X(n)$ to obtain the detail component $H_1(n)$, ($H_1(n) = X(n) - F_1(n)$); it is determined whether the detail component is an eigen-mode function or not, on the following conditions that:

first, the mean of the function is zero; the function is local symmetry; and the number of zero crossing points and the number of extreme points are the same or differ at most by one; and second, the sum of the upper and lower envelope values is always zero at any time.

If the conditions are not satisfied, steps 2) and 3) are repeated for $H_1(n)$ until the conditions are satisfied, and the first eigen-mode component $C_1(n)$ is obtained.

Figure 3:
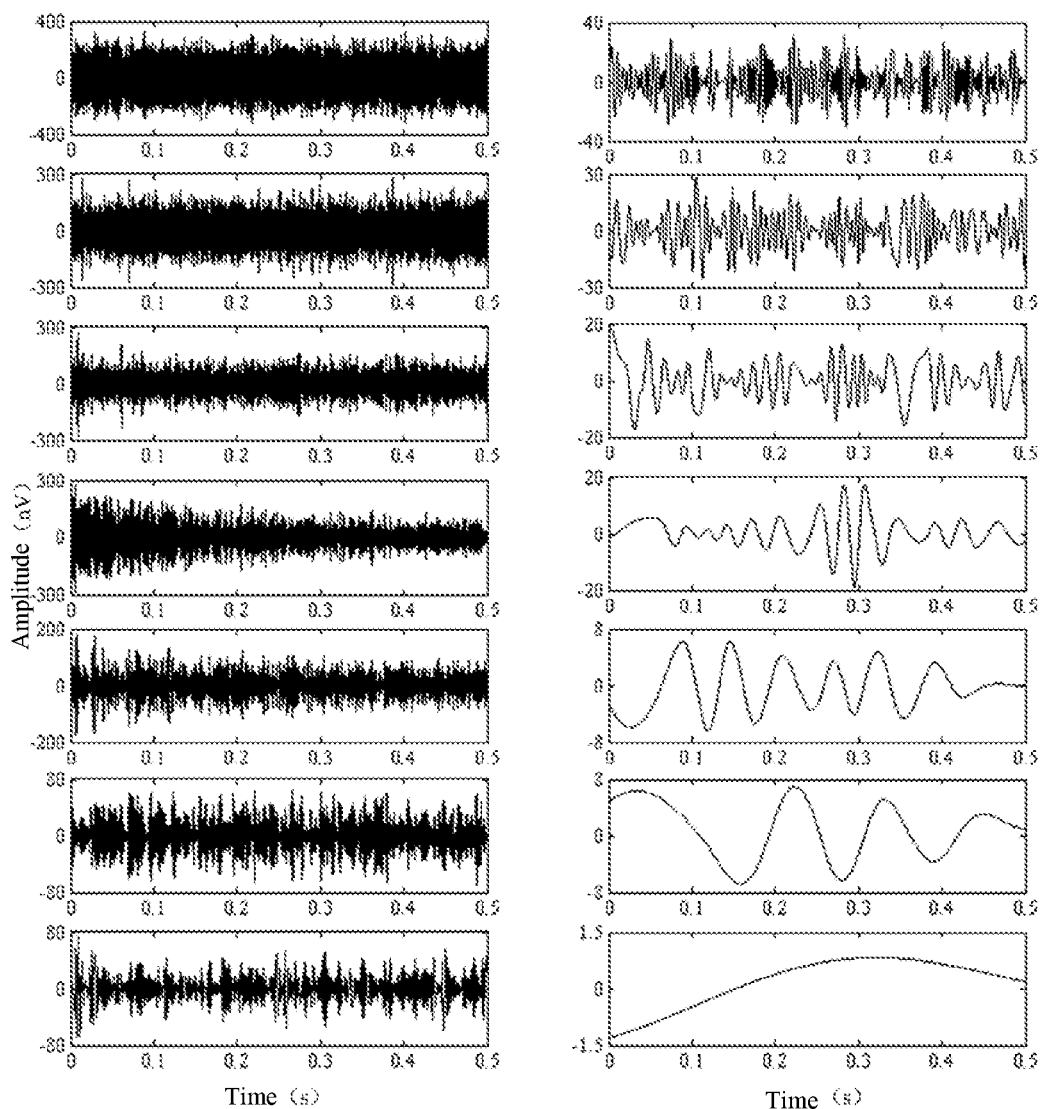
FIG. 3 shows the eigen-mode components obtained after decomposing the observed signal by using EMD algorithm.

5). The first eigen-mode component $C_1(n)$ is subtracted from the observed signal $X(n)$ to obtain the amount of residual $R_1(n)$, i.e., $X(n) - C_1(n) = R_1(n)$. The steps 2) ~4) are executed repeatedly for the amount of residual $R_1(n)$ as the new signal to be processed for continuous screening signal, until the second eigen-mode component $C_2(n)$ is obtained. And so on, as shown in FIG. 3, fourteen different eigen-mode components $C_1(n), \ldots, C_{14}(n)$ are obtained.

Figure 4:
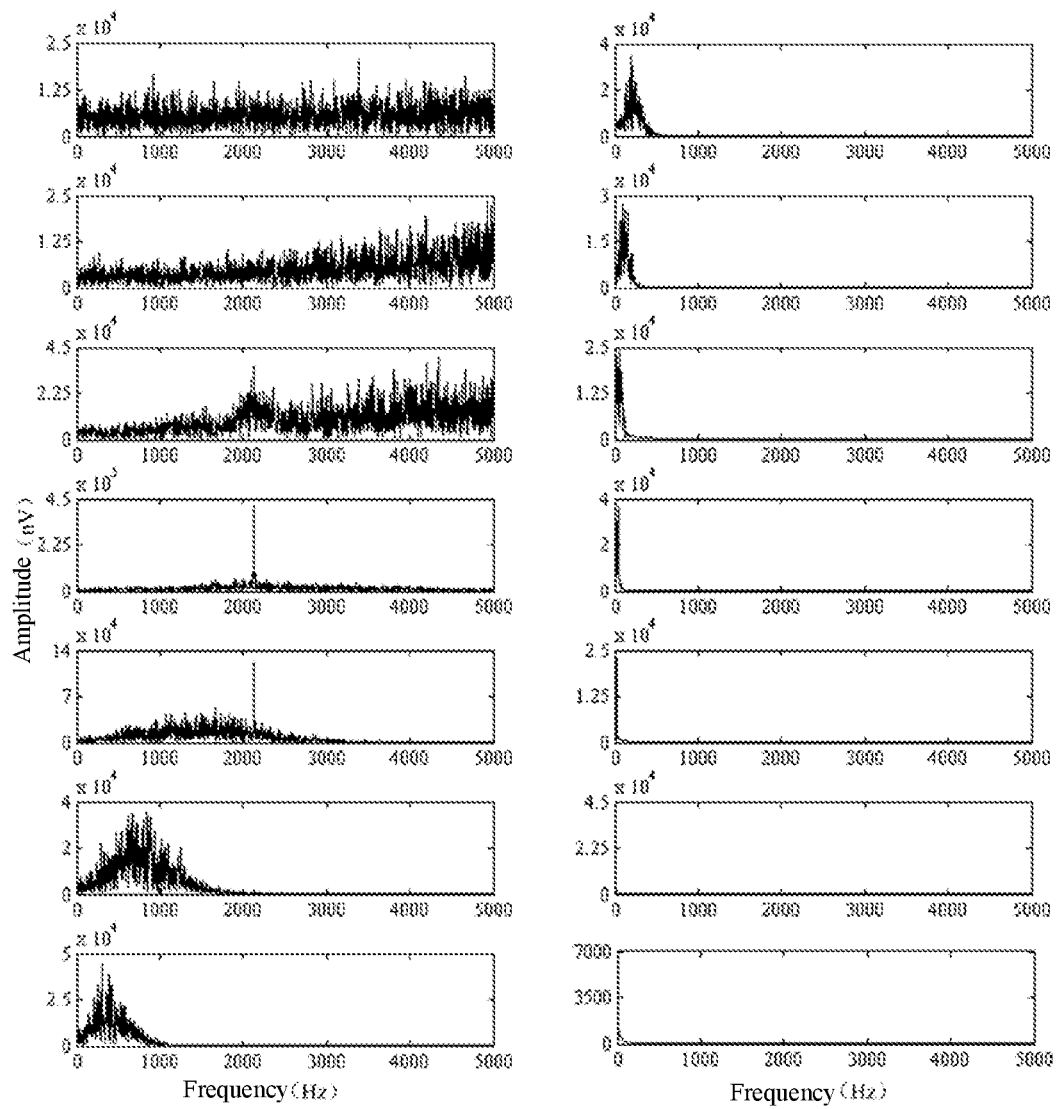
FIG. 4 shows the Fourier Transform of eigen-mode components.
Figure 5:
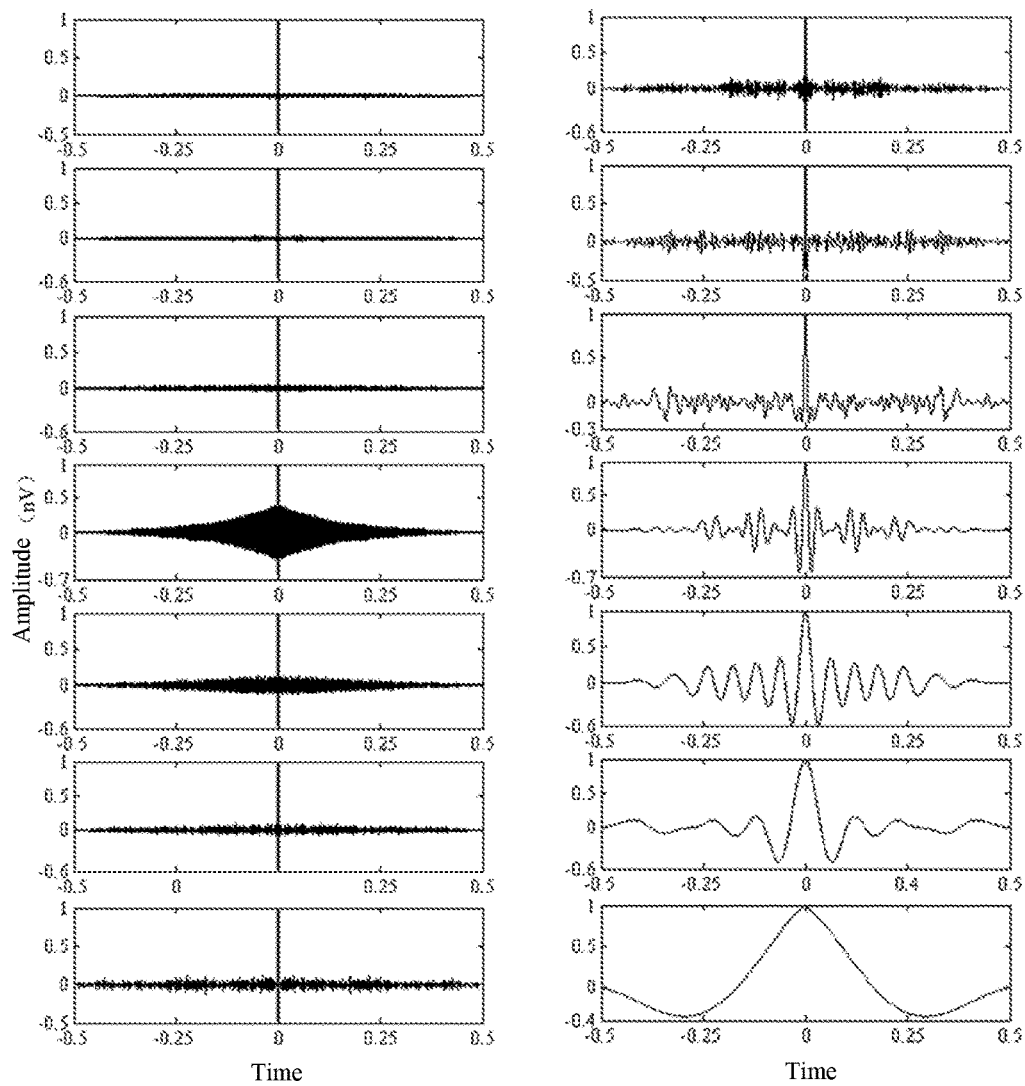
FIG. 5 shows the auto-correlation analysis of eigen-mode components.
Figure 6:
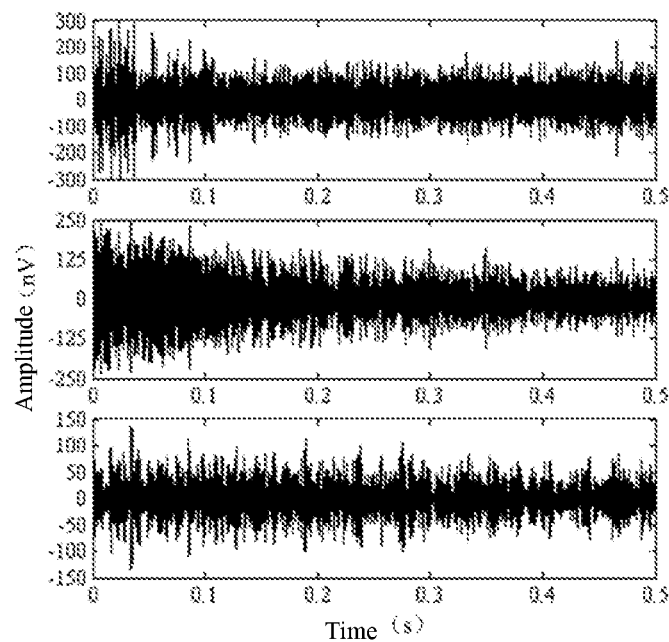
FIG. 6 shows the signal-dominated eigen-mode components.

6). The Fourier transform and the auto-correlation analysis are performed for the eigen-mode components $C_1(n), \ldots, C_{14}(n)$ shown in FIG. 3; and the spectrum of the eigen-mode components can be obtained by using fft command in Matlab, as shown in FIG. 4. The normalized auto-correlation function of the eigen-mode components is calculated by using xcorr command, as shown in FIG. 5. The results of the Fourier transform and the auto-correlation analysis are synthesized to obtain noise-dominated mode components and signal-dominant mode components; and three noise-dominated mode components $c_1(n)$, $c_2(n)$ and $c_3(n)$ are extracted, as shown in FIG. 6.

7). The first signal-dominated mode component $c_1(n)$ is processed by using the TFPF algorithm; and then the mode component can be encoded as the instantaneous frequency of the analytical signal. Since the edge energy of the time-frequency distribution of the analytical signal is not concentrated, the phenomenon of end-point distortion will be generated when the signal is recovered from the peak of time-frequency distribution. Consequently, it is necessary to perform the edge data extension firstly, to obtain the extended signal $c'_1(m)$, that is $$c'_1(m) = \begin{cases} c_1(1), & 1 \leq m \leq p \\ c_1(m-p), & p+1 \leq m \leq p+N \\ c_1(N), & p+N+1 \leq m \leq 2p+N \end{cases}$$

where N is the length of the original observed signal, and p is the number of data points extended at both ends.

8). To avoid a frequency overflow, when the signal is modulated as the frequency information, it is necessary to ensure that the frequency information is within a limited frequency range, consequently the signal $c'_1(m)$ needs to be scaled:

$$d'_1(m) = (a-b) \cdot \frac{c'_1(m) - \min[c'_1(m)]}{\max[c'_1(m)] - \min[c'_1(m)]} + b$$

where $d'_1(m)$ is the scaled signal, the coefficients a and b are the maximum and minimum values of the scaled signal respectively, satisfying $0.5 \geq a = \max[d'_1(m)]$, $b = \min[d'_1(m)] \geq 0$.

9). The frequency modulation encoding is performed for the scaled signal $d'_1(m)$, to obtain the analytical signal of unit amplitude:

$$z_1(m) = e^{j2\pi \sum_{\lambda=0}^{m} d_1'(\lambda)}$$

Where $z_1(m)$ is the analytical signal obtained after the frequency modulation encoding.

10). Discrete Pseudo-Wigner-Ville Transform is performed for the obtained analytical signal $z_1(m)$; and the time-frequency distribution of $z_1(m)$ is calculated:

$$W_{z_1}(m, k) = 2 \sum_{l=-L}^{L} w(l) z_1(m+l) z_1^*(m-l) e^{-j4\pi kl}$$

where w(l) is a window function and its width is 2L+1. After the Wigner-Ville Transform, the signal can be regarded as the distribution of its energy in the joint time domain and frequency domain, which is an important tool for analyzing a non-stationary time variant signal. When the signal is buried in the noise and is a linear function of time, an unbiased estimate of the signal can be obtained. Since the MRS oscillating signal is not a linear function of time, a local linearization processing is performed according to a method of instantaneous frequency estimation, by using a windowed Wigner-Ville Transform, i.e., the Pseudo-Wigner-Ville Transform, to calculate the time-frequency distribution, so that the signal approximately satisfies the condition of the linear instantaneous frequency within a window length; and the deviation caused by non-linearity of the signal can be reduced.

11). The peak of $W_{z_1}(m, k)$ is taken as a valid estimate of the signal, that is $$\widehat{s_1}'(m) = \arg_k\max[W_{z_1}(m,k)]$$

where $\arg_k\max[\cdot]$ represents taking the maximum operator along frequency.

12). The estimated value of the valid signal is inverse-scaled to restore the signal amplitude.

$$\widehat{s_1}(m) = \frac{(\widehat{s_1}'(m) - b)(\max[c'_1(m)] - \min[c'_1(m)])}{a - b} + \min[c'_1(m)]$$

13). The resulting extended edge obtained after filtering is removed to obtain the signal component $s_1(n)$ from which the random noise has been eliminated.

$$s_1(n) = \widehat{s_1}(n+p), 1 \leq n \leq N$$

Figure 7:
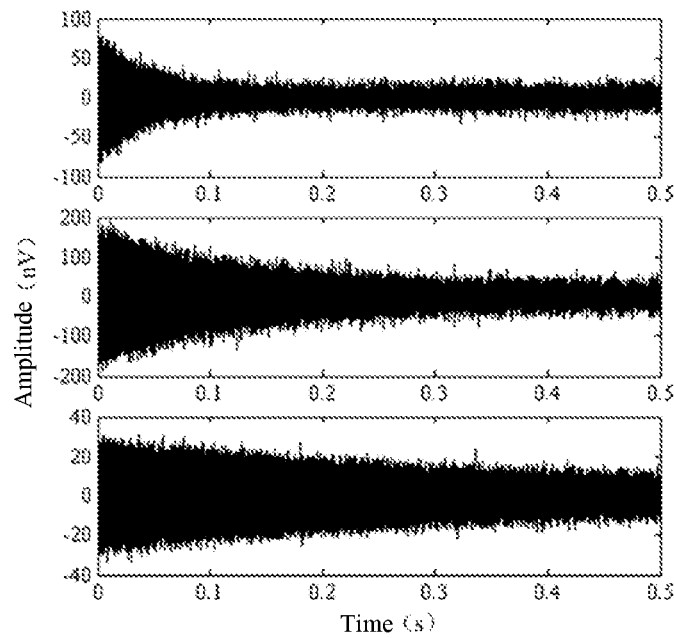
FIG. 7 shows the signal component obtained after reducing the random noise by using TFPF algorithm.

14). Next, the signal-dominated mode components $c_2(n)$ and $c_3(n)$ are sequentially processed in accordance with the above steps 7) to 13), to obtain the signal components from which the random noise has been eliminated, as shown in FIG. 7.

Figure 8:
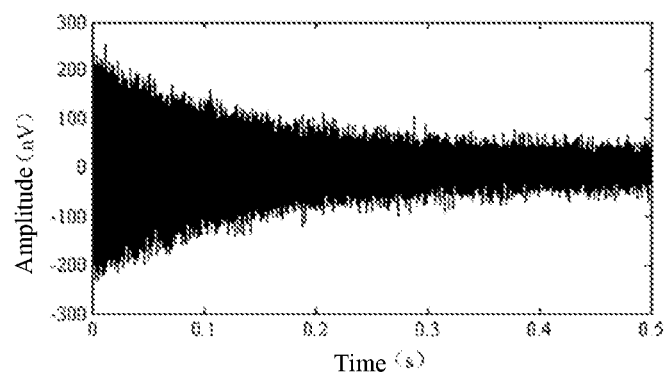
FIG. 8 shows the MRS oscillating signal obtained after reducing the random noise.

15). The processed signal components are added together to obtain a final MRS oscillating signal in which the random noise interference is eliminated, as shown in FIG. 8.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A method for reducing random noise from a magnetic resonance sounding (MRS) oscillating signal for groundwater detection using joint algorithms of Empirical Mode Decomposition (EMD) and Time-Frequency Peak Filtering (TFPF), comprising the following steps:
   a). performing an EMD decomposition for a MRS observed signal X(n) which is collected by a MRS groundwater detector, to decompose i different eigen-mode components $C_1(n), \ldots, C_i(n)$ and one trend term $R_t(n)$ from a high frequency to a low frequency, and $X(n) = C_1(n) + \ldots + C_i(n) + R_t(n)$; where n is a discrete sample point;
   b). performing a Fourier Transform and an auto-correlation analysis for the eigen-mode components $C_1(n), \ldots, C_i(n)$ and the trend term $R_t(n)$, synthesizing the Fourier Transform results and the auto-correlation analysis results to obtain noise-dominated mode components and signal-dominated mode components, and extracting the signal-dominated mode components $c_1(n), \ldots, c_j(n)$; where j is the number of the signal-dominated mode components;

c). using a TFPF algorithm to process the signal-dominated mode components $c_1(n), \ldots, c_j(n)$ respectively, to eliminate random noise contained in each signal-dominated mode component to obtain signal components $s_1(n), \ldots, s_j(n)$; and d). adding the signal components $s_1(n), \ldots, s_j(n)$ to obtain a final MRS oscillating signal s(n) having no random noise interference, $s(n)=s_1(n)+\ldots+s_j(n)$, thereby the final MRS oscillating signal with an increased signal-to-noise ratio for groundwater detection is generated.

2. The method of claim 1, wherein the EMD decomposition in the step a) uses EMD algorithm, comprising:

first step, identifying all the maximum points and all the minimum points of the observed signal X(n), and performing a cubic spline interpolation for all the maximum points and all the minimum points respectively, to obtain an upper envelope curve $E_{max}(n)$ and a lower envelope curve $E_{min}(n)$ of the data;

second step, calculating a corresponding average value of the upper and lower envelope curves to obtain a mean curve $F_1(n)$;

$$F_1(n) = \frac{E_{max}(n) + E_{min}(n)}{2}$$

third step, subtracting the average value $F_1(n)$ from the observed signal X(n) to obtain a detail component $H_1(n)$, and determining whether the detail component is an eigen-mode function on condition that:

①. a mean of the function is zero; the function is local symmetry, and the number of zero-crossing points and the number of extreme points are the same or differ at most by one; and ②. the sum of the upper and lower envelope values of the function is always zero at any time;

if the conditions are not satisfied, repeating the first and second steps for $H_1(n)$ until satisfying the conditions, and obtaining a first eigen-mode component $C_1(n)$;

fourth step, subtracting the first eigen-mode component $C_1(n)$ from the observed signal X(n) to obtain an amount of residual $R_1(n)$, that is:

$X(n)-C_1(n)=R_1(n)$ repeating the first, second and third steps for the amount of residual $R_1(n)$ as a new signal to be processed, for continuous screening signal; until obtaining a second eigen-mode component $C_2(n)$, and so on, obtaining i different eigen-mode components $C_1(n), \ldots, C_i(n)$ and one trend item $R_i(n)$:

$R_1(n)-C_2(n)=R_2(n), \ldots, R_{i-1}(n)-C_i(n)=R_i(n)$ $X(n)=C_1(n)+\ldots+C_i(n)+R_i(n).$ 3. The method of claim 1, wherein using the TFPF algorithm in the step c) comprises:

by using the TFPF algorithm, processing the first signal-dominated mode component $c_1(n)$ to obtain a signal component $s_1(n)$ from which the random noise has been eliminated, and the processing comprising:

1). performing an edge data extension for the signal-dominated mode component $c_1(n)$ to obtain an extended signal $c_1'(m)$, that is, $$c_1'(m) = \begin{cases} c_1(1), & 1 \le m \le p \\ c_1(m-p), & p+1 \le m \le p+N \\ c_1(N), & p+N+1 \le m \le 2p+N \end{cases}$$

where N is a length of the original observed signal, p is the number of data points extended at both ends;

2). scaling the extended signal $c_1'(m)$:

$$d_1'(m) = (a-b) \cdot \frac{c_1'(m) - \min[c_1'(m)]}{\max[c_1'(m)] - \min[c_1'(m)]} + b$$

where $d_1'(m)$ is the scaled signal, the coefficients a and b are the maximum value and the minimum value of the scaled signal respectively, satisfying $0.5 \ge a = \max[d_1'(m)]$, $b = \min[d_1'(m)] \ge 0$;

3). performing frequency modulation encoding on the scaled signal $d_1'(m)$ to obtain an analytical signal of unit amplitude:

$$z_1(m) = e^{j2\pi \sum_{\lambda=0}^{m} d_1'(\lambda)}$$

where $z_1(m)$ is the analytical signal obtained after the frequency modulation encoding;

4). performing Discrete Pseudo-Wigner-Ville Transform for the obtained analytical signal $z_1(m)$ to calculate a time-frequency distribution of $z_1(m)$:

$$W_{z_1}(m, k) = 2 \sum_{l=-L}^{L} w(l) z_1(m+l) z_1^*(m-l) e^{-j4\pi kl}$$

where w(l) is a window function and its width is 2L+1;

5). taking the peak of $w_{z_1}(m,k)$ as a valid estimate of the signal, that is: $\hat{s}_1'(m) = \arg_k\max [W_{z_1}(m,k)]$ where $\arg_k\max [\bullet]$ represents taking the maximum operator along frequency;

6). inverse-scaling the estimated value of the valid signal, and restoring the signal amplitude:

$$\hat{s}_1(m) = \frac{(\hat{s}_1'(m) - b)(\max[c_1'(m)] - \min[c_1'(m)])}{a-b} + \min[c_1'(m)]$$

7). removing the extended edge obtained after filtering, to obtain the signal component $s_1(n)$ from which the random noise has been eliminated:

$s_1(n) = \hat{s}_1(n+p)$, $1 \le n \le N$

8). processing the signal-dominated mode components $c_2(n), \ldots, c_j(n)$ sequentially in accordance with the above steps 1) to 7), to obtain the signal components $s_2(n), \ldots, s_j(n)$ from which the random noise has been eliminated.

* * * * *

UNITED STATES PATENT AND TRADEMARK OFFICE
CERTIFICATE OF CORRECTION

PATENT NO. : 10,677,957 B2  
APPLICATION NO. : 15/943852  
DATED : June 9, 2020  
INVENTOR(S) : Tingting Lin et al.

Page 1 of 1

It is certified that error appears in the above-identified patent and that said Letters Patent is hereby corrected as shown below:

On the Title Page

Add priority claim to Chinese Patent Application No. 201710981777.4 filed 10/20/2017

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*